United States Patent [19]
McCord

[11] 4,299,663
[45] Nov. 10, 1981

[54] VAPOR GENERATING DEVICE

[76] Inventor: James W. McCord, 9101 Nottingham Pkwy., Louisville, Ky. 40222

[21] Appl. No.: 142,107

[22] Filed: Apr. 21, 1980

[51] Int. Cl.³ .......................... B01D 3/42; B08B 7/04
[52] U.S. Cl. ................................. 202/170; 202/206; 203/2; 134/12; 134/109
[58] Field of Search ............ 203/2, DIG. 9; 202/160, 202/170, 235, 206; 134/12, 90, 105, 107, 109, 108

[56] References Cited

U.S. PATENT DOCUMENTS

| | | | |
|---|---|---|---|
| 3,011,956 | 12/1961 | Smith et al. | 202/206 |
| 3,293,151 | 12/1966 | Holzer et al. | 202/206 |
| 3,464,895 | 9/1969 | Boyd | 202/206 |
| 3,483,092 | 12/1969 | Young | 202/206 |
| 3,803,002 | 4/1974 | Skraba et al. | 203/2 |
| 4,003,798 | 1/1977 | McCord | 203/2 |
| 4,096,039 | 6/1978 | Carnine et al. | 203/2 |
| 4,204,913 | 5/1980 | Sabatka et al. | 203/2 |

*Primary Examiner*—Wilbur L. Bascomb, Jr.
*Attorney, Agent, or Firm*—Charles G. Lamb

[57] ABSTRACT

A vapor generating device including a housing having an open top and closed bottom with a cleaning solvent therein. The housing is provided with first heat means in the bottom thereof to boil the solvent and cooling means in the top thereof to condense the solvent and prevent the solvent from escaping from the housing. A second heat means is provided in the bottom of the housing operable whenever a change in energy requirement within the housing is necessary. The vapor generating device is particularly useful as a cleaning device.

5 Claims, 4 Drawing Figures

VAPOR GENERATING DEVICE

BACKGROUND OF THE INVENTION

This invention relates to a vapor generating and recovering apparatus for vaporizing a liquid and condensing a vapor and more particularly relates to an improved apparatus for vaporizing a liquid and condensing a vapor wherein the heat requirement within the apparatus is subjected to instantaneous and substantial changes.

In the present state of the art, vapor generating and recovering devices for vaporizing and condensing a liquid are utilized in many different areas. For example, in the cleaning of objects such as metallic tools, plastic parts, and the like, hot or boiling solvents have been utilized to remove undesirable soluble and particulate matter from these tools, parts, and the like by immersing the soiled object into hot or boiling solvent. In bringing the solvent to a boiling temperature, a solvent vapor zone is created above the boiling solvent solution in the tank or chamber in which the objects may be placed for cleaning. The vaporized solvent is then subject to cooling or condensing means and is recovered. However, when baskets or parts are immersed into the boiling solvent the heat requirements undergo a radical change as it is necessary to provide more heat to the solvent to maintain the solvent in a boiling or vaporizing condition and maintain vapor level and constant distillation. Furthermore, when these objects are removed from the solution less heat requirements are needed. Vapors then escape the condensing zone of the apparatus through the open top as the vaporization of the liquid solvent increases substantially and the condensing means is generally insufficient to keep up with the dramatic change in the decreased heat requirements of the apparatus.

SUMMARY OF THE INVENTION

It has been found that in most vapor generating and recovering apparatuses for vaporizing a liquid and then condensing the vaporized liquid in the cleaning of objects, when the objects are immersed into the vaporizing liquid, the heat requirements of the apparatus change and the vapor immediately collapses in the unit. Furthermore, when the objects are removed from the unit the heat requirement for the boiling of the liquid solvent in the apparatus is decreased and the condensing means is insufficient to prevent vapors from escaping the apparatus due to the instantaneous change in heat requirements. In order to compensate for this it has now been found that a second heat source be applied to the liquid, this heat source can be in communication with and actuated by a sensing device which is disposed within the vapor or condensing zone of the apparatus so that when the heat requirements are changed the second heat source or means can be increased or decreased depending upon the heat energy requirements.

More particularly, a vapor generating device comprises: a housing having an open top and a closed bottom with cooling means in an upper portion thereof; the housing having heat means in a lower portion thereof operable in response to a change in preselected energy requirements within the housing, the housing including a vaporizing solvent therein.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWING

Referring to the drawings.

DESCRIPTION OF THE PREFERRED EMBODIMENTS

Figure 1:
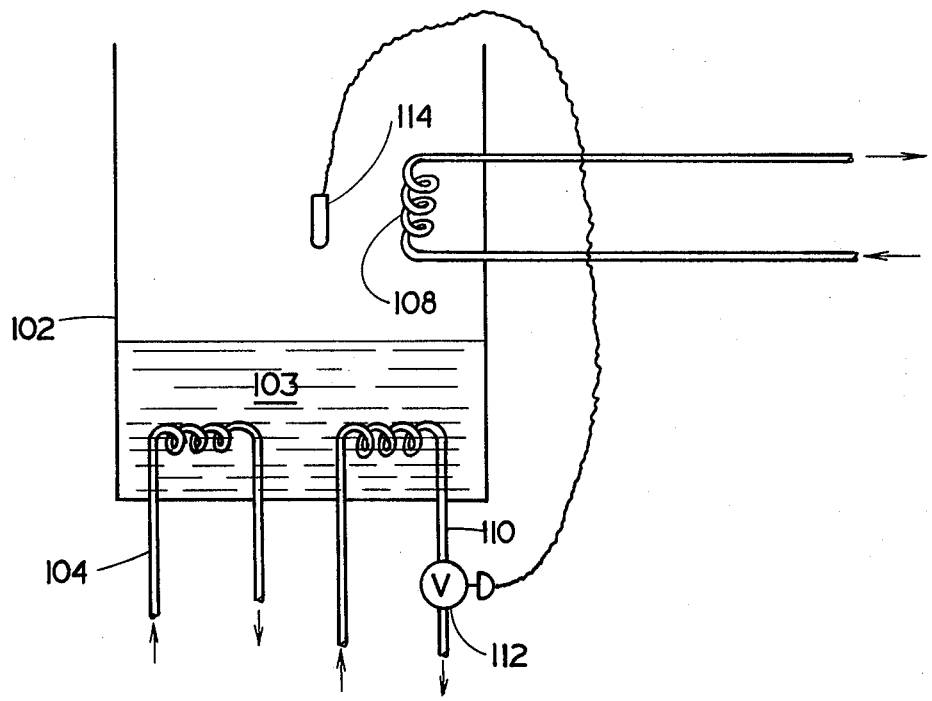
FIG. 1 is a schematic diagram of a preferred vapor generating device for the present invention.

In FIG. 1, a container 102 for vaporizing a liquid 103 and then condensing the vaporized liquid is provided. Disposed within the liquid and near the bottom of the container 102 is a first heating coil 104 which provides heat to vaporize the liquid 103. Heating coil 104 may be electrical, gas, steam, water, or contain a refrigerant therein. Furthermore, coil 104 may be in communication with any other well known means for providing constant heat to the liquid within the container 102, such as the system disclosed in U.S. Pat. No. 4,003,798.

Disposed within the vapor zone of the container 102 is a cooling coil 108, cooling coil 108 being provided to maintain a preselected temperature in the container below the vaporizing temperature of the liquid. The cooling coil 108 may include cold water, refrigerant, or any other well known means for keeping or maintaining a cooling temperature in the container.

In the container 102 is a second heating coil 110 which has variable control means therein actuated in response to preselected conditions within the vapor zone of the container 102. As shown in FIG. 1, a valve 112 within coil 110 is provided to be actuated in response to a temperature sensing device 114 which is disposed within the upper portion of the vapor zone of the container 102. As shown, when the temperature in the vapor zone changes the temperature sensing device 114 senses the change and then actuates the valve 112 which either decreases or increases the flow of heating fluid through the coil 110 to either increase or decrease the heat requirements within the liquid. For example, when a basket of metal objects to be cleaned are immersed into the liquid 103 the temperature of the boiling liquid is decreased sharply and the temperature within the vapor zone also decreases thereby collapsing the vapor zone. Thus, additional heat is needed immediately. The sensing device 114 actuates control valve 112 in an opening position thereby providing immediate heat into the liquid 103 to increase the needed heat requirements for maintaining the liquid in a boiling or vaporizing state. As soon as the objects are removed from the container 102 the heat requirements decrease and as the temperature in the vapor zone increases the sensing device 114 actuates valve 112 in a closing position decreasing the heating fluid passing through coil 110 thereby returning the system to a lower heat energy usage. It is realized that a temperature sensing device is shown, but other environmental sensing devices may also be used, such as a pressure sensing device.

Figure 2:
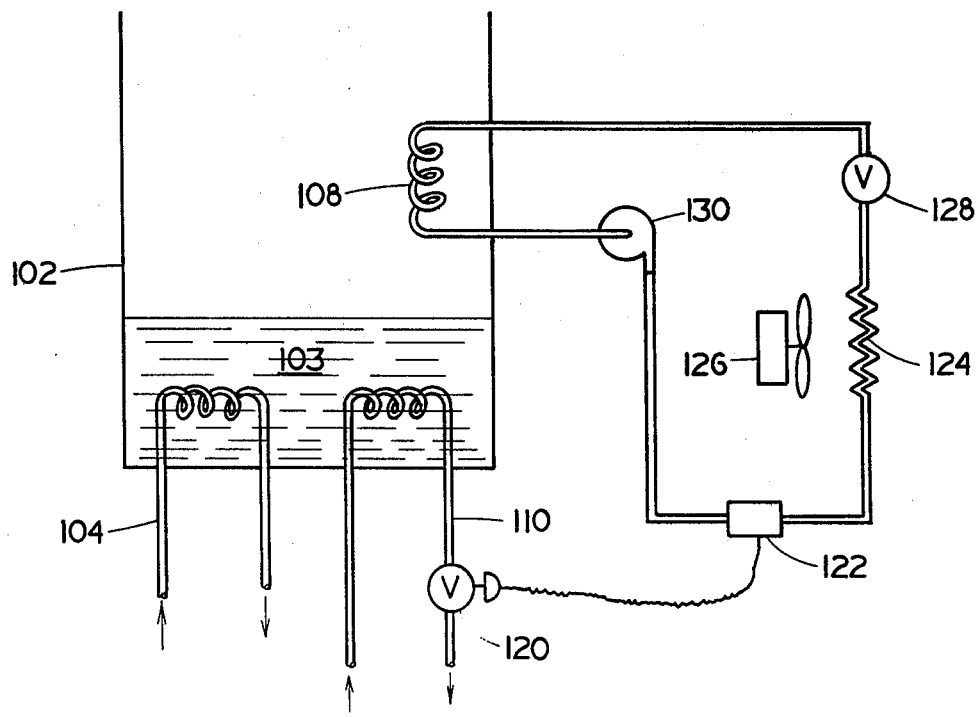
FIG. 2 is a schematic diagram of another preferred vapor generating device of the present invention.

In FIG. 2, the second heating coil 110 in container 102 is provided with variable control means therein actuated in response to a sensing device as noted by numeral 122. Sensing device 122 may be a pressure or temperature sensing device. Sensing device 122 is in actuating communication with flow control valve 120 for controlling the heat emitting device to heating coil 110. The refrigeration system further includes a compressor 130 for compressing a refrigerant, a heat exchanger 124 for removing heat from the system, heat exchanger 124 being any known in the art but exemplified as air cooled by blower 126, and an expansion valve 128.

In the operation of the apparatus shown in FIG. 2, when the objects to be cleaned are immersed in the liquid 103 the temperature of the boiling liquid is decreased thereby decreasing the temperature of the vapor zone which in turn collapses the vapor zone. Thus, a change in heat requirements is necessary. In order to accomplish this, sensing device 122 senses that more heat is needed to maintain the vapor zone and thereby actuates control valve 120 to allow additional heat to heat emitting device 110. When the objects to be cleaned are removed less heat is needed and sensing device 122 senses this thereby actuating control valve 120 to a closing position.

Figure 3:
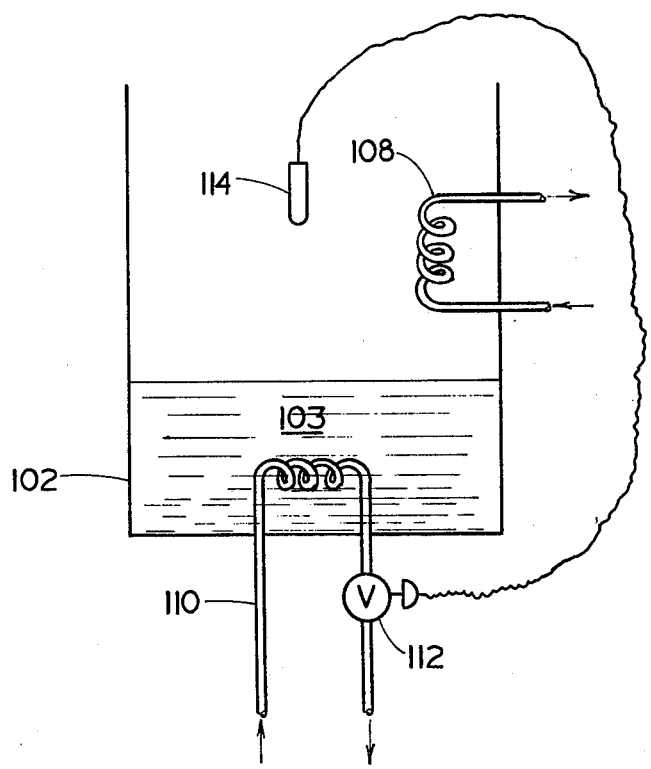
FIG. 3 is a schematic diagram of a vapor generating device of the present invention; and, FIG. 4 is a schematic diagram of a vapor generating device of the present invention.

Even though two heating means are shown in FIGS. 1 and 2 as being preferred, in order to establish control over the operation of the vapor generating, it is realized that under some circumstances only one is necessary. FIG. 3 shows a variable heat source in heat transfer relation with a single heating coil 110 varying the heat in response to sensing device 114.

Figure 4:
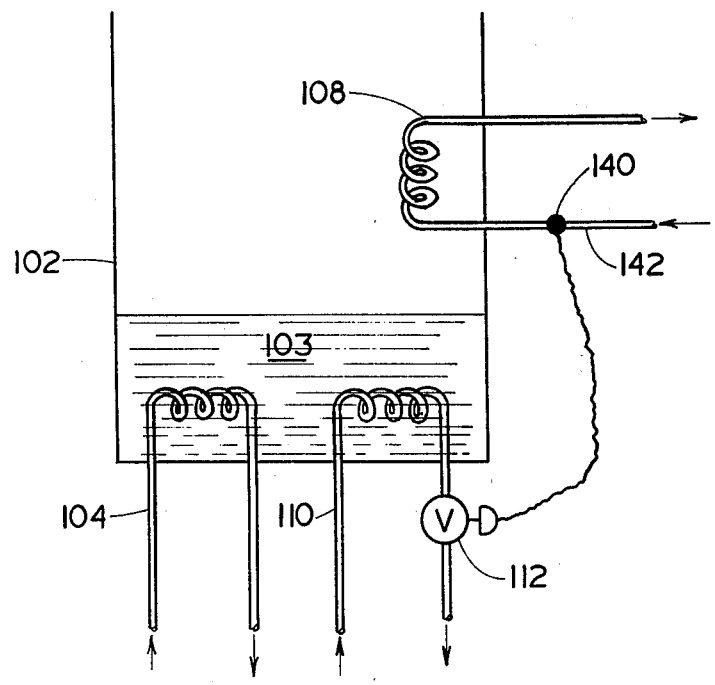

In FIG. 4, a sensing device 140 is incorporated in the outlet cooling coil 108. A change in the energy requirements in the vapor zone will change the temperature or pressure in the outlet fluid stream 142 which through sensing device 140 will actuate flow control valve 112.

It is realized that other changes may also be made to the embodiments shown without departing from the scope and spirit of the present invention.

What is claimed is:

1. A vapor generating device for immersing objects to be cleaned in a vaporizing solvent comprising:

A housing having at least one container therein for vaporizing and condensing the vaporizing solvent, said container having an open top and a closed bottom with cooling means in an upper portion thereof, the container having a heat means in a lower portion thereof operable in response to a change in energy requirements in said container, said heat means includes a first heat means and a second heating means, the first heating means having a fixed heat input and the second heating means having a variable heat input actuated by a sensing device disposed in said upper portion.

2. The device of claim 1 wherein said container includes temperature sensing means at a preselected position in the upper portion thereof in actuating communication with said second heating means.

3. The device of claim 1 wherein the second heating means includes a heating device with variable control means therein actuated in response to an environmental sensing means disposed in the upper portion of said housing.

4. The device of claim 1 wherein the second heating coil is actuated in response to a pressure sensing means.

5. The device of claim 1 wherein the second heating means is actuated in response to a thermal sensing unit in the cooling means.

* * * * *